United States Patent [19]
Toyoda et al.

[11] Patent Number: 5,543,833
[45] Date of Patent: Aug. 6, 1996

[54] SCANNER FOCUSSING METHOD AND APPARATUS CONCURRENTLY DISPLAYING MULTIPLE PARTIAL SCANS WITH DIFFERENT FOCUS SETTINGS

[75] Inventors: Kenji Toyoda, Chagaski; Kazushi Minagawa, Yokahama, both of Japan

[73] Assignee: Nikon Corporation, Tokyo, Japan

[21] Appl. No.: 416,476

[22] Filed: Apr. 4, 1995

Related U.S. Application Data

[63] Continuation of Ser. No. 201,454, Feb. 24, 1994, abandoned.

[30]    Foreign Application Priority Data

Feb. 24, 1993   [JP]   Japan ...................... 5-033803

[51] Int. Cl.⁶ .............................. H04N 5/253; H04N 9/47
[52] U.S. Cl. .............................. 348/110; 355/56; 358/527
[58] Field of Search ...................... 348/110, 111, 348/112, 96; 355/55, 56; 395/128; 358/527, 533, 454

[56]           References Cited

U.S. PATENT DOCUMENTS

| | | | |
|---|---|---|---|
| 4,349,836 | 9/1982 | Sawano | 348/112 |
| 4,819,073 | 4/1989 | Bridges | 348/110 |
| 4,858,003 | 8/1989 | Wirt et al. | 348/110 |
| 5,191,406 | 3/1993 | Brandestini et al. | 348/110 |

*Primary Examiner*—Brian Zimmerman
*Assistant Examiner*—Michael Day

[57]                ABSTRACT

An image input apparatus, or "scanner," capable of adjusting the focal point of an image-forming optical system and pre-scanning the same portion of an original document for various focal points of the image-forming optical system. The various pre-scan images are displayed side-by-side on a display device so that an operator can compare images and select an appropriate focal point. The scanner includes an image-forming optical system which forms an image of an original source, an image pickup unit, positioned so as to correspond with the image-forming optical system, for sensing the image formed by the image-forming optical system, an adjustment mechanism for adjusting the focus of the image-forming optical system, and a display device, interfaced to the image pickup unit, for displaying the image sensed by the image pickup unit. A control device controls the image forming optical systems so that a partial area of the original source is scanned and displayed on the display device, wherein the control device causes a scan of the partial area of the original source up to a specified number of times and displays the results of the partial scanning for the specified number of times side by side on the display device. A method is also provided for scanning an original source and displaying multiple partial scans on a display device.

29 Claims, 5 Drawing Sheets

SCANNER FOCUSSING METHOD AND APPARATUS CONCURRENTLY DISPLAYING MULTIPLE PARTIAL SCANS WITH DIFFERENT FOCUS SETTINGS

This application is a continuation of application Ser. No. 08/201,454, filed Feb. 24, 1994, now abandoned.

BACKGROUND OF THE INVENTION

1. Field of the Invention

The present invention relates to an image input apparatus, commonly called a "scanner," and a scanning method which converts an image to electrical signals and inputs those signals into a computer.

2. Description of the Related Art

In a conventional image input apparatus, or "scanner," an image of an original print or photographic film is formed on a CCD linear sensor using an image-forming optical system. The image signal is processed in sequence while scanning by moving the linear sensor within an image forming plane in a direction perpendicular to the array of the pixels in the CCD linear sensor.

In most of these conventional scanners, the positional relationship of the image-forming optical system is fixed. As recognized by the present invention, this fixed positional relationship results in a reduction in the resolution of the processed image due to slippage of the focal point brought about by floating or warping of the original or by fluctuation in the thickness of a slide mount or film holder.

Moreover, in scanners which are equipped with an autofocus mechanism, there is a problem in that the configuration becomes complex, resulting in higher costs.

SUMMARY OF THE INVENTION

Accordingly, it is an object of the present invention to provide a scanner having a relatively easy-to-use, efficient operation for adjusting focus of the scanner.

It is also an object of the present invention to provide a scanner capable of producing images with sufficient image quality by adjusting the focal point of the image-forming optical system.

A further object of the present invention is to provide a scanner allowing an operator to simultaneously observe a desired scan area of an original document in different focus conditions on the same screen, making it is easy to determine which focus condition is most appropriate.

An additional object of the present invention is to provide a scanner permitting determination of the most appropriate focus condition in the desired area of the original source without the use of autofocus mechanisms, which are complex and expensive.

Additional objects and advantages of the invention will be set forth in part in the description which follows, and, in part, will be obvious from the description, or may be learned by practice of the invention.

The foregoing objects of the present invention are achieved by providing a scanner comprising an image-forming optical system which forms an image of an original source, an image pickup unit, positioned so as to correspond with the image-forming optical system, for sensing the image formed by the image-forming optical system, an adjustment mechanism for adjusting the focus of the image-forming optical system, a display device, interfaced to the image pickup unit, for displaying the image sensed by the image pickup unit and a control device for controlling the image forming optical systems so that a partial area of the original source is scanned and displayed on the display device. The control device causes a scan of the partial area of the original source up to a specified number of times and displays the results of the partial scanning for the specified number of times side by side on the display device.

The foregoing objects of the present invention are also further achieved by providing a related method for forming an image of an original source that displays multiple partial scans on a display device.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
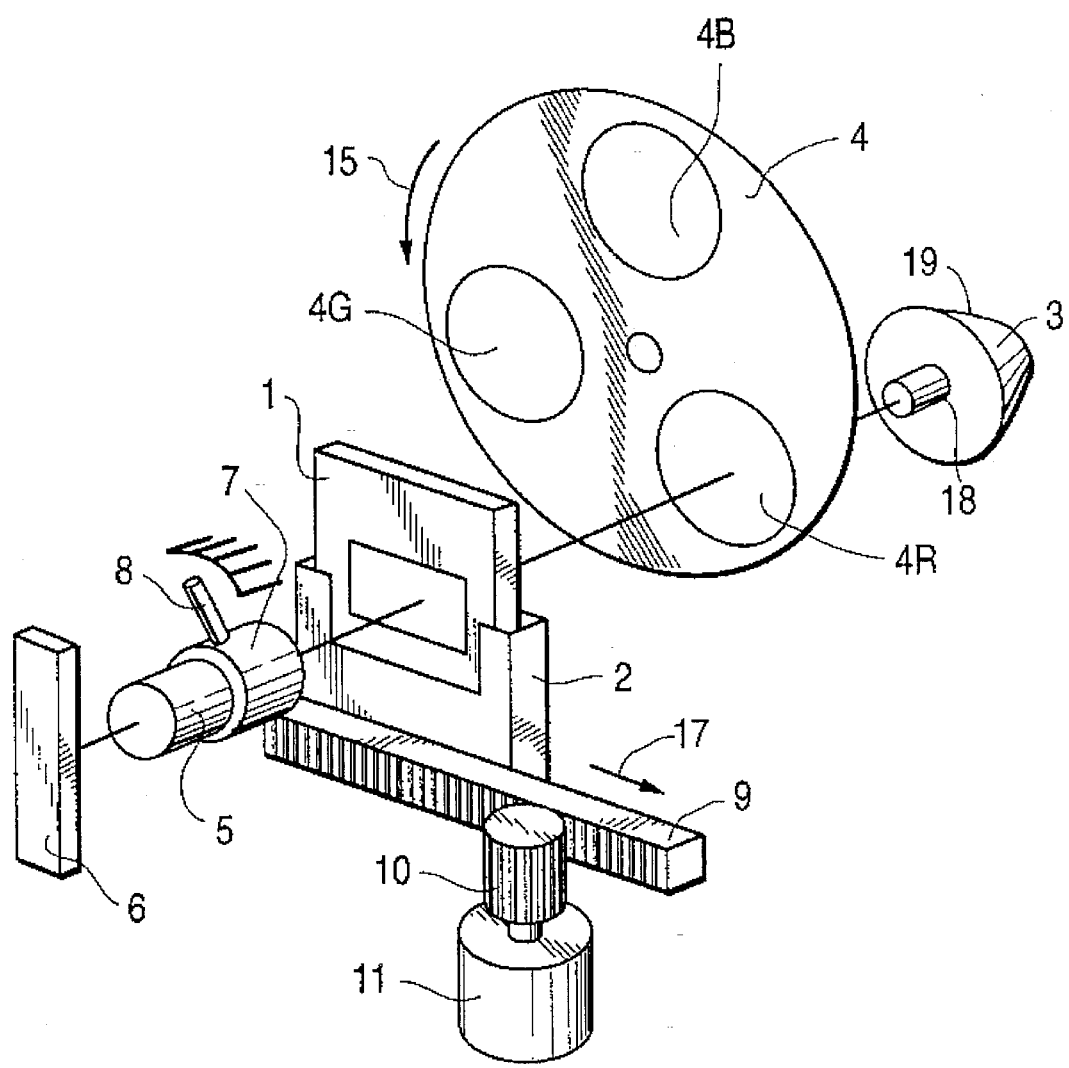
FIG. 1 is a diagram which illustrates an overall hardware configuration of a film scanner in an embodiment of the present invention.

Reference will now be made in detail to the preferred embodiments of the present invention, examples of which are illustrated in the accompanying drawings, wherein like reference numerals refer to like elements throughout.

FIG. 1 is a diagram which illustrates an overall hardware configuration of a film scanner in an embodiment of the present invention. Slide 1 of an original image storage device, such as film, is maintained in holder 2. Slide 1 is illuminated by light source 3 with filter wheel 4 positioned between slide 1 and light source 3. Filter wheel 4 is configured so that it is rotated in the direction of arrow 15 through a drive device (not illustrated). Filter wheel 4 has a red filter 4R, green filter 4G and blue filter 4B positioned as shown in FIG. 1. At a particular time, one of the three colored filters, 4R, 4G or 4B, is positioned in the illumination optical path of light source 3. Light source 3 includes light emitting tube 18 and hood 19. Hood 19 generally has a curved inner surface. Slide 1 is then illuminated from the rear by light of the different colors. An image of slide 1 is formed on an image pickup plane of CCD linear sensor 6 through image-forming lens 5. Image-forming lens 5 generally has a curved surface. CCD linear sensor 6 is equipped with light-receiving sections arrayed vertically in a single column. CCD linear sensor 6 sequentially outputs electrical signals corresponding to the strength of the incident light of each light-receiving section.

Image-forming lens 5 can be moved forward or backward by moving member 7 (which could be helicoid). The focal point of the image of slide 1 formed on CCD linear sensor 6 can be adjusted through manual operation of focus lever 8.

Rack 9 is secured to holder 2. Rack 9 is meshed through pinion 10 to drive motor 11, thereby allowing movement of rack 9 in a direction perpendicular to the direction of the array of light-receiving sections of CCD linear line sensor 6. In effect, rack 9 can move in the direction of arrow 17.

Figure 2:
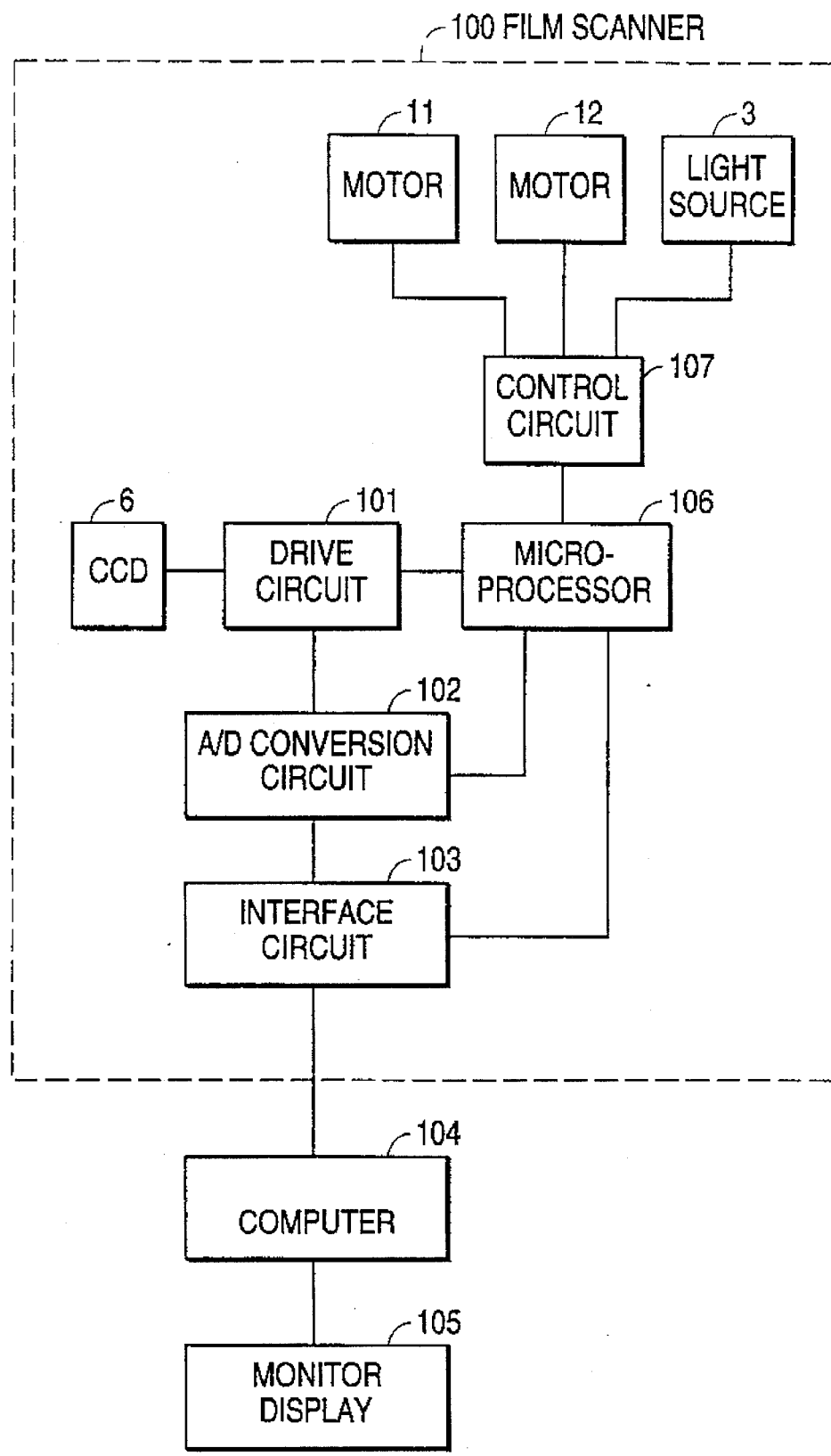
FIG. 2 is a block diagram which illustrates an overall embodiment of the present invention.

FIG. 2 is a block diagram which shows an overall configuration of an embodiment of the present invention. CCD linear sensor 6 is driven by CCD drive circuit 101. An output signal of CCD drive circuit 101 is converted to a digital signal by A/D conversion circuit 102 and supplied to computer 104 (preferably a personal computer) through interface circuit 103. Monitor display 105 is connected to computer 104 and displays the supplied image and control information. Commands which are necessary for control are sent from computer 104 to microprocessor 106 through interface circuit 103. Microprocessor 106 controls CCD drive circuit 101, A/D conversion circuit 102 and control circuit 107 according to those commands. Control circuit 107 controls motor 11 (which moves slide 1), motor 12 (which rotates filter wheel 4) and light source 3. CCD linear sensor 6, drive circuit 101, motor 11, motor 12, light source 3, control circuit 107, microprocessor 106, A/D conversion circuit 102, and interface circuit 103 constitute film scanner 100.

Figure 3:
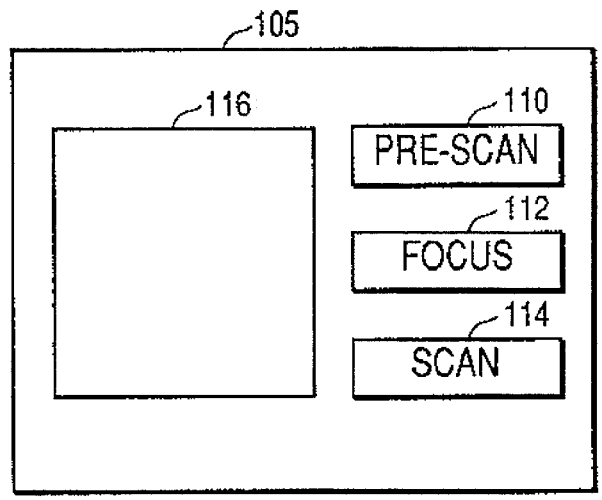
FIG. 3 is a diagram which illustrates a monitor display condition of an embodiment of the present invention.

As illustrated in FIG. 3, monitor display 105 displays a menu having "Pre-scan" 110, "Focus" 112 and "Scan" 114 selections and window 116 which shows images. Slide 1 of the original is set in holder 2 and "Pre-scan" 110 is selected from the menu using a keyboard (not illustrated) or a mouse (not illustrated). The type of scan called "Pre-scan" is well-known, but it will be explained briefly below.

A command is sent from computer 104, causing light source 3 to emit light. The red filter 4R of filter wheel 4 is controlled so that it is positioned in the illumination optical path. Holder 2 begins to move in the direction of arrow 17 through the work of drive motor 11, pinion 10, and rack 9. In synchronization with this movement, an image signal from CCD linear sensor 6 is sent to computer 104 by A/D conversion circuit 102 and interface circuit 103 and is displayed as an image in window 116 of the monitor display 105. When the above operation has been completed for the entire screen of slide 1, the green filter 4G of the filter wheel 4 is positioned in the illumination optical path, and the above process is repeated. Finally, the blue filter 4B is positioned in the illumination optical path and the above process is repeated. A full-color image which combines the three colors is displayed in window 116. The process of the above "pre-scan" does not involve the handling of one pixel at a time but instead, in order to save time, the process handles approximately eight pixels of the output of CCD linear sensor 6 at a time so that the sending pitch from holder 2 is eight times the pitch of conventional systems. The number of pixels handled at a time can be varied based on system design parameters.

The position of image-forming lens 5 is arbitrary, so there is a strong possibility that the displayed image will be out of focus. A keyboard or a mouse is used to select a focus lever position to bring the displayed image into focus and, when "Focus" 112 is selected from the screen of monitor display 105, the operation indicated by the flowchart in FIG. 7 is started by computer 104.

Figure 4:
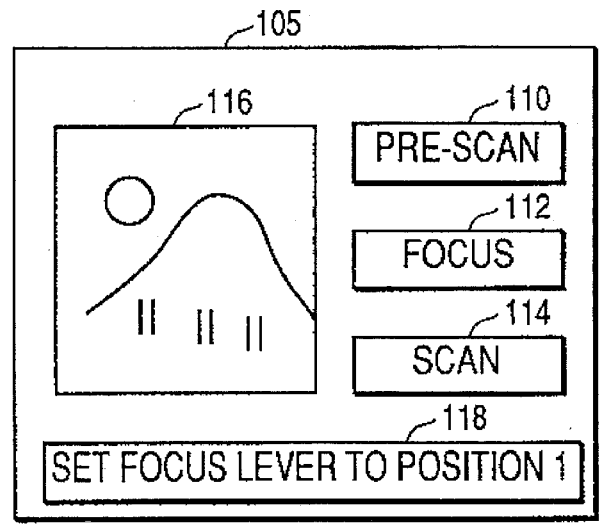
FIG. 4 is a diagram which illustrates a monitor display condition of an embodiment of the present invention.
Figure 5:
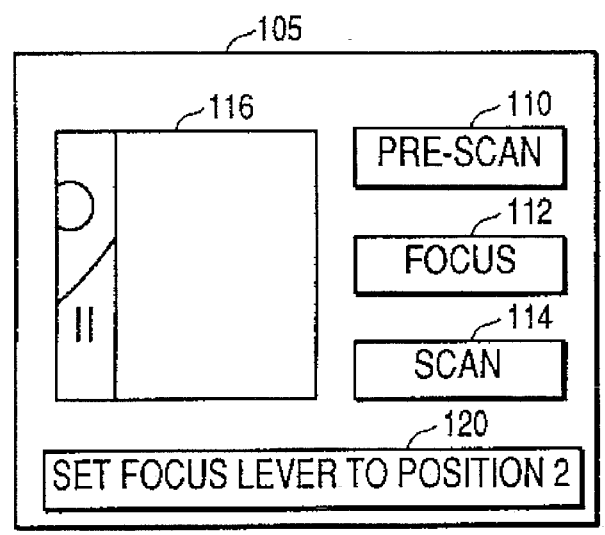
FIG. 5 is a diagram which illustrates a monitor display condition of an embodiment of the present invention.
Figure 7:
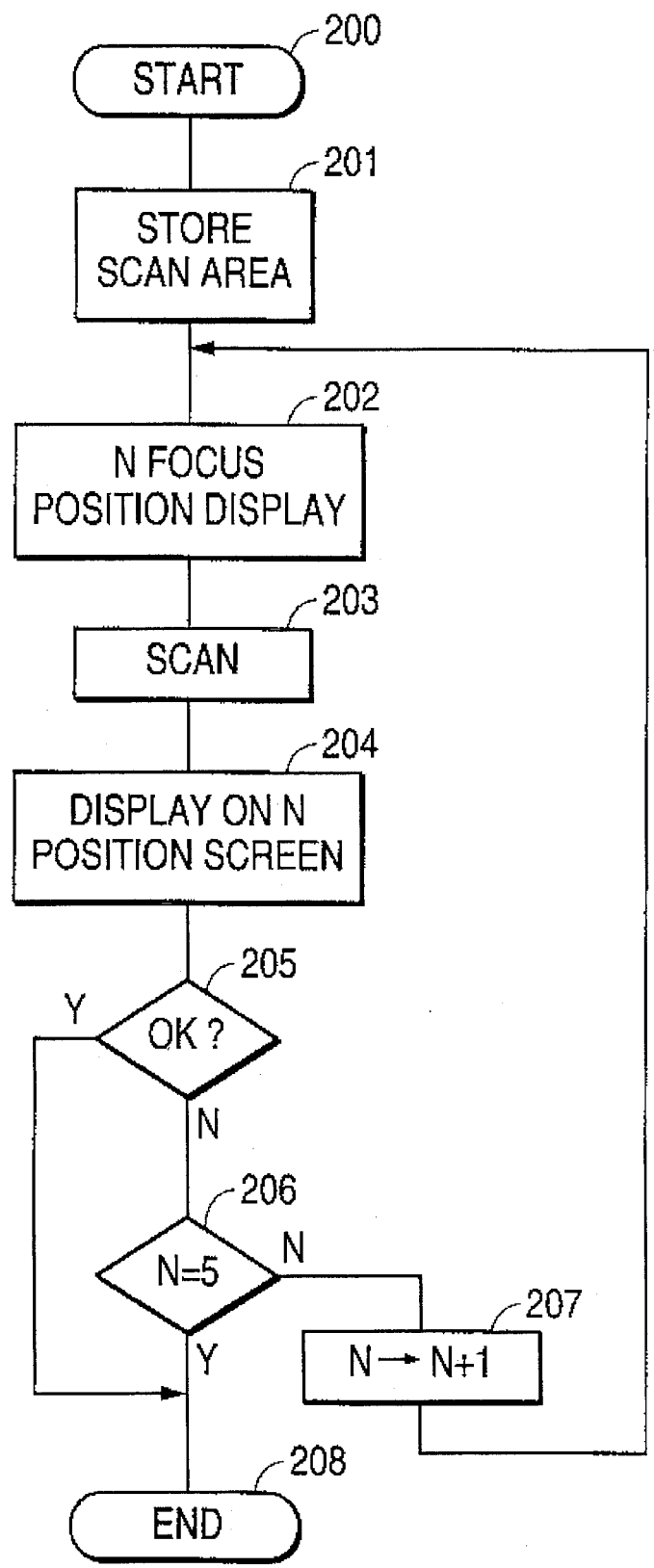
FIG. 7 is a flowchart of the operation of an embodiment of the present invention.

Referring now to FIG. 7, after start step 200, the area of slide 1 to be scanned (the "scan area") is stored in step 201. In step 202, the command for setting the focus lever to the "N" position is displayed. First, in a built-in counter (not illustrated) of computer 104, data which indicates the position of focus lever 8 is initially set to N=1 and, as illustrated in FIG. 4, the message "Set focus lever to position 1" 118 is displayed on the screen of monitor display 105. Then, in step 203, a command is sent from computer 104 and, at this time, the periphery of the location specified (step 201) on slide 1 is scanned in three colors by the previously described scan method. The results of the scan are stored in an internal memory (not illustrated) of computer 104. In step 204, the scan results stored in the internal memory are displayed at the Nth position on monitor display 105. When N=1, the display in window 116 is in the form of a long vertical strip, as shown in FIG. 5. At this time, the pixels of CCD linear sensor 6 are handled one at a time and the sending pitch is the minimum corresponding pitch.

Figure 6:
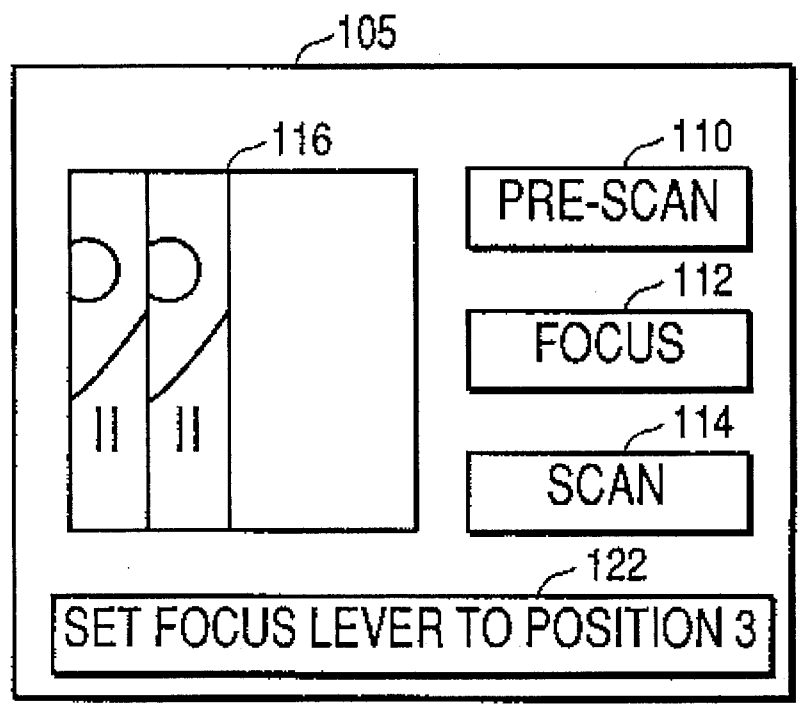
FIG. 6 is a diagram which illustrates a monitor display condition of an embodiment of the present invention.

Next, the operator determines whether the focus condition displayed on the screen of monitor display 105 is appropriate and, if it is appropriate, an "OK" indication is input by the operator using the keyboard. In step 205, a determination is made as to whether the judgement result input through the keyboard indicates "OK"; If OK, flow is ended at step 208; If not OK, the system proceeds to step 206 where it is determined whether the focus position is at the last position where N=5. In this example, N=1, so the system proceeds to step 207 where the internal counter is increased by one, resulting in N=2. The system then returns to step 202. At this time, "Set focus lever to position 2" 120, as indicated in FIG. 5, is displayed on monitor display 105 and, when a reply of "OK" is returned to computer 104, scanning of the same location is performed in three colors by the same method as described above. The results are displayed alongside the previous results, as shown in FIG. 6, with "set focus lever to position 3" 122 displayed on monitor display 105.

Figure 8:
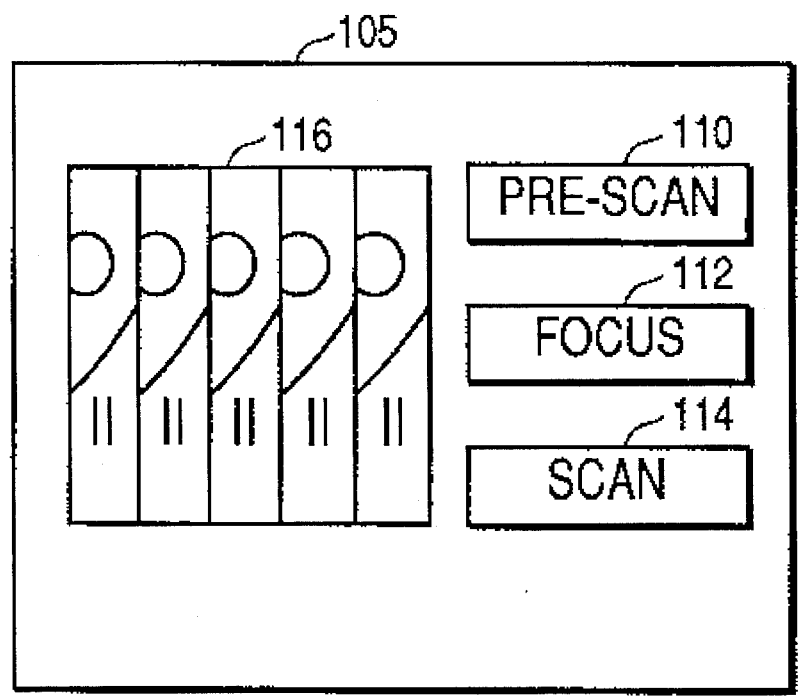
FIG. 8 is a diagram which illustrates a monitor display condition of an embodiment of the present invention.

In this manner, monitor display 105 shows the repetition of scans of the same location for each focus lever position and, as a result, five images which correspond to the five positions of focus lever 8 are displayed, as shown in FIG. 8. A determination can then be made by the operator as to which image is the most in focus, focus lever 8 can then be set to that position, and a scan operation of the entire slide 1 can begin.

When "scan" 114 is then selected from monitor display 105, a command is sent from computer 104 and the entire image of slide 1 is scanned in three colors by the previously described scan method at an image pitch and sending pitch which have been determined in advance. The scan results are then sent to computer 104 and displayed on monitor display 105.

In the present embodiment, CCD linear sensor 6 is fixed during scan and slide 1 was moved. However, the opposite situation in which slide 1 is fixed and CCD linear sensor 6 is moved is also acceptable.

A linear CCD sensor is used in the present embodiment. However, an area CCD sensor having a light-receiving plane which covers the image of the original sufficiently through an image-forming optical system may also be used.

With the present invention, it is possible to simultaneously observe the desired area of the original in different focus conditions on the same screen, so it is easy to determine which focus condition is most appropriate.

The present invention permits determination of the most appropriate focus condition in the desired area of the original without the use of autofocus mechanisms, which are complex and expensive.

The preferred embodiments of the image input apparatus of the present invention comprise an image-forming optical system which forms the image of the original, an adjustment device which adjusts the image-forming optical system so that the image of the original is formed on a specified plane, an image pickup device positioned so that the specified plane corresponds approximately to a light-receiving plane, a display device which displays the image signal from the image pickup device, and a control device which causes partial scanning and scans the part of the area of the image pickup device within the specified plane corresponding to the original. Results of the partial scanning are displayed on the display device. The control device permits the partial scanning up to a specified number of times and displays the results of the partial scanning for the specified number of times side by side on the display device.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An image input apparatus comprising:

an image-forming optical system which forms an image of an original source;

an image pickup unit which senses the image formed by said image-forming optical system;

an adjustment mechanism which adjusts the focus of said image-forming optical system, the adjustment mechanism being settable to different focus positions;

a display device, interfaced to said image pickup unit, which displays the image sensed by said image pickup unit; and a control device which causes a specified number of images of approximately a same partial area of the original source to be formed by the image-forming optical system and sensed by the image pickup unit, the adjustment mechanism being set at a different respective focus position during each image formed of the partial area, and which causes each image formed of the partial area to be simultaneously displayed on said display device.

2. An apparatus as in claim 1, wherein an operator can control the operation of the image input apparatus by selecting from at least one scan command displayed on said display device before the images of the partial area of the original source are formed.

3. An apparatus as in claim 2, wherein the at least one scan command includes pre-scan.

4. An apparatus as in claim 2, wherein said image pickup unit comprises a linear CCD sensor.

5. An apparatus as in claim 2, wherein said image pickup unit comprises an area CCD sensor.

6. An apparatus as in claim 2, wherein said control device causes a specified number of images of approximately a same partial area of the original source to be formed by moving the original source so that the partial area is exposed to said image-forming optical system and an image of the partial area is formed by said image-forming optical system.

7. An apparatus as in claim 2, wherein said control device causes a specified number of images of approximately a same partial area of the original source to be formed by fixing the position of the original source and moving said image pickup unit over the partial area.

8. An apparatus as in claim 3, wherein the at least one scan command comprises three separate commands, a first command of the separate commands being pre-scan, a second command of the separate commands being scan and a third command of the separate commands being focus.

9. An apparatus as in claim 3, wherein said image pickup unit comprises a linear CCD sensor.

10. An apparatus as in claim 3, wherein said image pickup unit comprises an area CCD sensor.

11. An apparatus as in claim 3, wherein said control device causes a specified number of images of approximately a same partial area of the original source to be formed by moving the original source so that the partial area is exposed to said image-forming optical system and an image of the partial area is formed by said image-forming optical system.

12. An apparatus as in claim 3, wherein said control device causes a specified number of images of approximately a same partial area of the original source to be formed by fixing the position of the original source and moving said image pickup unit over the partial area.

13. An apparatus as in claim 8, wherein said image pickup unit comprises a linear CCD sensor.

14. An apparatus as in claim 8, wherein said image pickup unit comprises an area CCD sensor.

15. An apparatus as in claim 8, wherein said control device causes a specified number of images of approximately a same partial area of the original source to be formed by moving the original source so that the partial area is exposed to said image-forming optical system and an image of the partial area is formed by said image-forming optical system.

16. An apparatus as in claim 8, wherein said control device causes a specified number of images of approximately a same partial area of the original source to be formed by fixing the position of the original source and moving said image pickup unit over the partial area.

17. An apparatus as in claim 1, wherein said image pickup unit comprises a linear CCD sensor.

18. An apparatus as in claim 1, wherein said image pickup unit comprises an area CCD sensor.

19. An apparatus as in claim 1, wherein said control device causes a specified number of images of approximately a same partial area of the original source to be formed by moving the original source so that the partial area is exposed to said image-forming optical system and an image of the partial area is formed by said image-forming optical system.

20. An apparatus as in claim 1, wherein said control device causes a specified number of images of approximately a same partial area of the original source to be formed by fixing the position of the original source and moving said image pickup unit over the partial area.

21. An apparatus as in claim 1, wherein said control device causes the partial scans to be displayed side by side on said display device.

22. An apparatus as in claim 1, wherein the control device causes each image formed of the partial area to be adjacently displayed on the display device.

23. A method for forming an image of an original source and displaying the image on a display device, using an image-forming optical system which forms an image of the original source, an image pickup unit which senses the image formed by the image-forming optical system and a focus adjustment mechanism which adjusts the focus of the image-forming optical system, the focus adjustment mechanism being settable to a first focus position and a second focus position to adjust the focus, the method comprising:

forming an image of a partial area of the original source with the image-forming optical system while the focus adjustment mechanism is set to the first focus position, to form a first image of the partial area;

sensing the first image with the image pickup unit;

displaying the first image on the display device;

setting the focus adjustment mechanism of the image-forming optical system to the second focus position;

forming an image of the partial area of the original source with the image-forming optical system while the focus adjustment mechanism is set to the second focus position, to form a second image of the partial area;

sensing the second image with the image pickup unit; and displaying the second image on the display device simultaneously with the first image.

24. A method as in claim 23, wherein the step of displaying the second image further comprises adjacently displaying the first image and the second image on the display device.

25. A method as in claim 23, wherein the focus adjustment mechanism is settable to a specified number of focus positions and the method further comprises:

forming a specified number of images of the partial area of the original source, the specified number of images corresponding, respectively, to the specified number of focus positions; and displaying the specified number of images simultaneously on the display device.

26. A method as in claim 25, wherein the step of displaying the specified number of images further comprises displaying the specified number of images adjacently on the display device.

27. A method as in claim 25, wherein the display device has a specified number of partitioned regions corresponding to the specified number of images and the step of displaying the specified number of images further comprises displaying the specified number of images in the respectively corresponding partitioned regions.

28. A method as in claim 23, wherein the display device has first and second partitioned display regions and the step of displaying the second image further comprises displaying the first and second images in the respective first and second partitioned regions.

29. A method as in claim 23, further comprising, after the step of displaying the first image on the display device and before the step of setting the focus adjustment mechanism to the second focus position, the step of:

displaying an instruction to set the focus adjustment mechanism of the image-forming optical system to the second focus position.

* * * * *